April 26, 1960  G. A. LYON  2,934,376
WHEEL COVER
Filed May 22, 1956  2 Sheets-Sheet 1
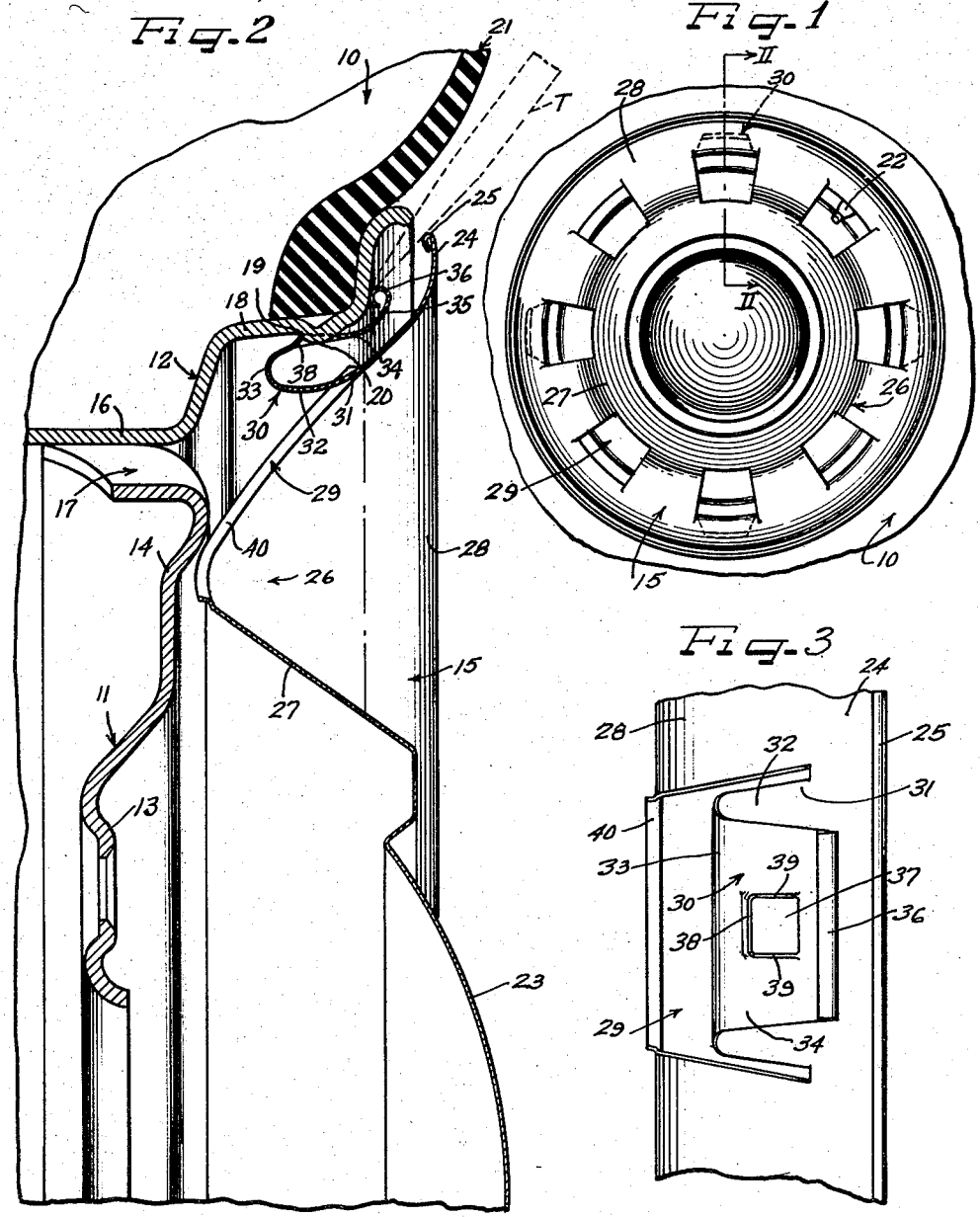
Inventor
GEORGE ALBERT LYON

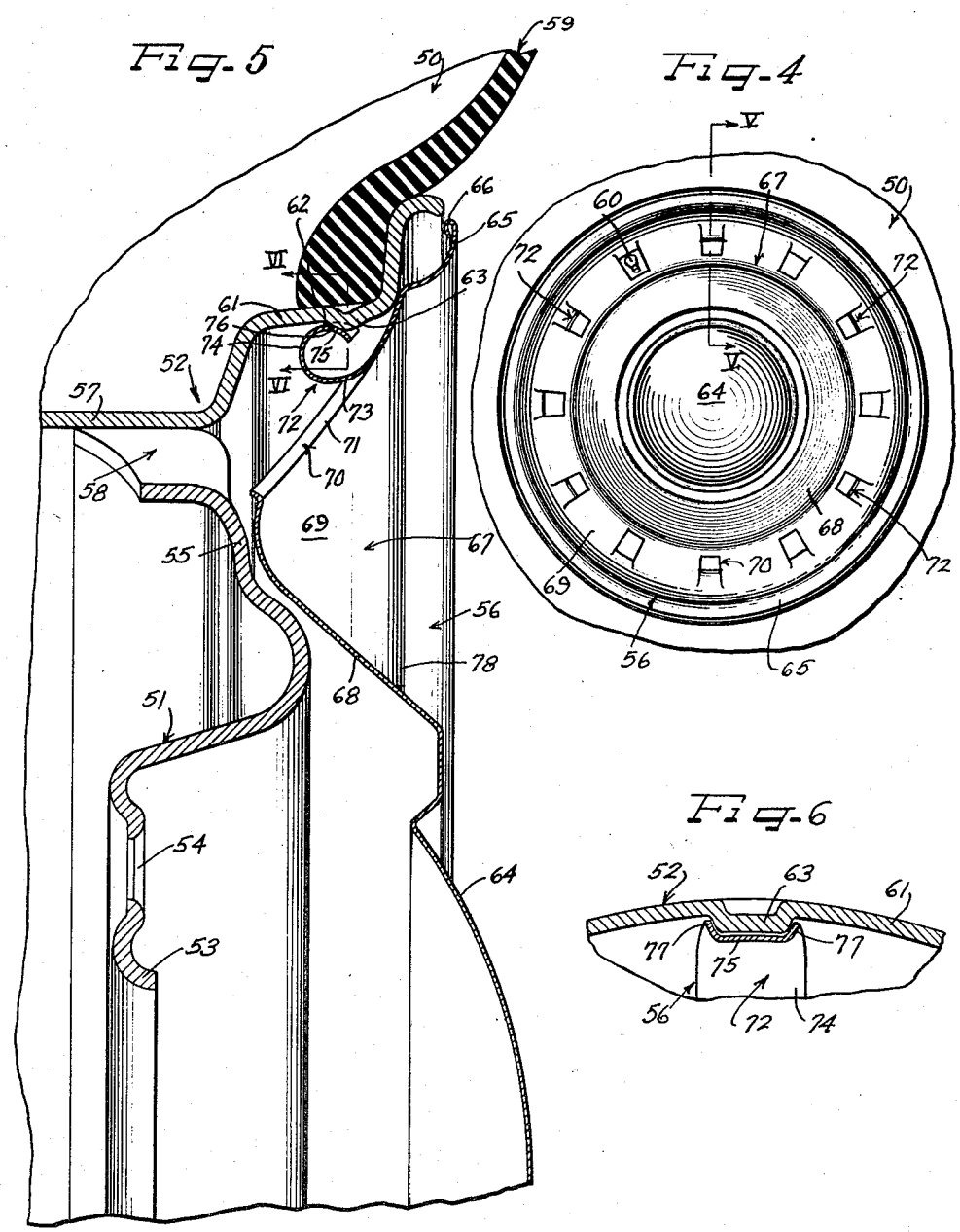

United States Patent Office 2,934,376
Patented Apr. 26, 1960

2,934,376
WHEEL COVER
George Albert Lyon, Detroit, Mich.
Application May 22, 1956, Serial No. 586,440
4 Claims. (Cl. 301—37)

This invention relates generally to a wheel structure and more particularly to a wheel cover member in overlying retained disposition upon a vehicle wheel.

The cover of the present invention is particularly formed and provided with circumferentially spaced wheel openings with at least certain of the openings having material cut out and being formed into cover retaining finger-like extensions. In other words, the cut out material is so cut out that it remains connected to the cover and is bent upon itself defining a loop with the loop having an edge surface and opposed side edge surfaces which together define a pocket. The first edge surface is adapted to detachably snap behind retaining shoulders on the vehicle wheel. If bumps are utilized, the opposed side edge surfaces are adapted to bear against sides of the bump to insure co-rotation of the cover and wheel.

Accordingly, an object of this invention is to provide a new and improved cover construction having novel means for retaining the same upon a vehicle wheel.

A further object of this invention is to provide a cover construction having retaining means which when assembled upon the vehicle wheel will co-rotate therewith.

Still another object of this invention is to provide a wheel cover having circumferentially spaced openings which are disposed generally opposite wheel openings to facilitate in the cooling of the wheel.

Yet another object of this invention is to provide a new and improved wheel structure and particularly a wheel cover which lends itself to economical manufacture on a large production basis.

According to the general features of this invention there is provided in a wheel structure including a wheel having circumferentially spaced wheel openings between body and rim parts and having rigid shoulder means on an axial portion of the wheel, a wheel cover member adapted for overlying disposition upon the wheel having circumferentially spaced openings generally opposite the wheel openings with the cover opening material forming extensions integral at one end with the cover, said extension being return bent upon itself defining a loop including a resilient axial portion, the axial portion having an edge surface to detachably engage behind the shoulder means to maintain the cover in assembly upon the wheel.

Other objects and features of the present invention will more fully become apparent in view of the following detailed description taken in connection with the accompanying drawings illustrating several embodiments thereof and in which:

Figure 1 is a side elevation of my wheel structure in full and dotted lines;

Figure 2 is an enlarged fragmentary cross sectional view taken substantially on the line II—II of Figure 1 looking in the direction indicated by the arrows;

Figure 3 is an enlarged fragmentary edge elevation of my cover further illustrating the retaining extensions;

Figure 4 is a side elevation of a modified form of my invention wherein a wheel structure is shown;

Figure 5 is an enlarged fragmentary cross sectional view taken substantially on the line V—V of Figure 4 looking in the direction indicated by the arrows; and Figure 6 is a fragmentary cross sectional view taken substantially on the line VI—VI of Figure 5 looking in the direction indicated by the arrows.

As shown on the drawings:

The reference numeral 10 in Figures 1 and 2 indicates generally my wheel structure with the wheel structure including body and rim parts 11 and 12. The body part 11 has a bolt on flange 13 which is adapted to be attached to a vehicle axle such as an automobile by means of bolts being threaded on studs emanating from the axle (not shown). It will be noted the body part 11 is flattened generally at 14 for the purposes of accommodating a relatively deeply drawn cover member 15.

The body part 11 is suitably connected to base flange 16 of the tire rim 12 which is preferably of the stepped multiflanged drop center type. Positioned generally at the junction of the rim and body parts at circumferentially spaced intervals are wheel openings 17 which open axially rearwardly onto the brake drum area of the wheel.

The tire rim 12 includes a generally axial flange 18 which is provided with a shoulder 19 and in the present form of the invention has circumferentially spaced bumps 20 on the axial rim flange 18.

Mounted upon the tire rim 12 is a conventional tire assembly 21 which may be either of the tube or tubeless type and is adapted to be inflated by means of a valve 22 shown in Figure 1.

The cover 15 of my invention may be made from spring steel, preferably stainless, and includes a central crown 23 and an outer margin 24 which is underturned at 25 to reinforce the margin. In the present instance the outer margin 24 of the cover 15 is positioned generally opposite the outer margin of the tire rim 12.

Located between the central crown 23 and the outer margin 24 is a deeply dished drawn cover portion 26 including a generally radially outwardly axially inwardly extending portion 27 and a generally radially and axially outwardly extending portion 28.

The portion 28 is provided at circumferentially spaced intervals with cover openings 29 which are positioned generally opposite the wheel openings 17 in order to facilitate in the direction of air through the respective openings as the wheel is rotating and by the air being channeled into the dished portion 26 upon the brake drum area of the wheel.

A suitable number of looped resiliently deflectable retaining extensions 30 have been provided which in each instance are formed from material which has been substantially struck out from one of the openings 29. The edge defining each of the cover openings 29 is spaced from its associated extension 30 to allow the extension to resiliently deflect relative to the cover opening and its edge. In other words, end 31 of the extensions remains integral with the cover 15. The resilient looped extensions 30 include a generally axial leg or portion 32, a generally radial portion 33, a generally axial leg or portion 34 and terminating in a generally radial portion 35 having a beaded extremity 36. The extensions are generally arcuate or curled outwardly of the bumps 20.

Each of the generally axially outwardly extending axial extension portions 34 is provided with an opening 37 (Figure 3). The opening 37 is defined by generally radially outwardly turned edges. Included among the edges is a turned edge 38 which is adapted to retainingly engaged behind the shoulder 19 of the bump 20. Among other edges are opposite edges or side surfaces 39 (Figure 3) which are adapted to bear against opposite sides of the bumps 20 to insure co-rotation of the cover when it is assembled upon the wheel. By turning the edges generally radially outwardly it will be appreciated a pocket of increased depth is created which pocket is adapted to receive the bump 20 in the manner aforesaid.

Bounding the cover opening 29 on three sides are turned edges 40. These turned edges are adapted to reinforce the dished cover portion 26 and additionally to provide adequate clearance for the retaining extensions 30 to deflect as they are engaged and disengaged from the wheel.

A suitable number of retaining extensions 30 may be utilized although in the present form of the invention I have illustrated the cover as having four extensions 30 (Figure 1).

In the assembly of the cover upon the wheel, the cover and retaining pockets initially centered with respect to the wheel and bumps with the axial portion 34 of the retaining extensions 30 being tentatively engaged against the tire rim 12. Upon the application of further pressure, the extension 30 is caused to deflect generally radially inwardly in such a manner as to allow the gripping biting edge 38 to slide over and behind the bump 20 in cover retaining engagement therewith. As this is brought about, the side edges or surfaces 39 are disposed on opposite sides of the bumps and adapted to bear there against to insure co-rotation. When the cover is in full assembly the pocket envelops the bump and the beaded extremity 36 is in bottomed engagement against the tire rim 12.

In the removal of the cover from the wheel a suitable pry-off tool T may be utilized. To this end the tool may be inserted underneath the outer margin 24 of the cover with the tip of the tool being forceably urged underneath the beaded extremity 36 and upon the application of enough leverage the cover may be ejected from the wheel.

In Figures 4–6 is shown a modified form of my invention wherein the reference numeral 50 indicates generally my wheel structure. The wheel structure 50 includes body and rim parts 51 and 52 respectfully. The body part 51 includes a central bolt-on flange 53 which is adapted to be assembled upon the axle of a vehicle, such as an automobile, by inserting lugs through the openings 54 and threading nuts upon the lugs to clamp the wheel upon the axle.

The body part 51 also includes a flattened area 55 which is adapted to receive a dished deeply drawn wheel cover 56.

The body part 51 is suitably connected to a base flange 57 of the tire rim 52 which is preferably of the stepped multi-flanged drop center type. Disposed generally at the junction of the body and rim parts 51 and 52 are wheel openings 58 which open rearwardly to the brake drum area of the wheel.

Carried upon the tire rim 52 is a conventional tire assembly 59 which may be either of the tube or tubeless type and which lends itself to being inflated by a valve 60 (Figure 4).

The tire rim 52 includes an axial rim flange 61 having a shoulder 62 on the axially inner side of circumferentially spaced pressed out bumps 63.

The cover 56 preferably of the full disk type is adapted to overlie substantially the entire body and rim parts. The cover is preferably made from strainless spring steel in order that the cover may be readily polished to attain a highly lustrous and attractive ornamental appearnce.

The cover 56 includes a central crown 64 and an outer margin 65 terminating in a beaded extremity 66. Disposed between the central crown 64 and margin 65 is a central deeply drawn dished portion 67. The dished portion 67 is defined by a generally radially outwardly axially inwardly extending portion 68 and a generally radially and axially outwardly extending portion 69. It will be noted when the cover is in assembly upon the wheel, the dished area 67 lies in close proximity to the flattened body part 55. Provided on the cover portion 69 at circumferentially spaced intervals are cover openings 70 which openings are bounded by a generally axially inwardly turned continuous edge 71 which is adapted to reinforce the dished cover portion 67, and in addition, provide clearance for resiliently deflectable looped retaining extensions 72.

The looped extensions 72 may be of any suitable number and include a generally axially inwardly extending portion 73 which is connected and in fact remains integral with the cover portion 69 since the extensions 72 are principally formed from material cut out from the cover to define the cover openings 70. Connected at the axially inner end of the extension portion 73 is a generally radial portion which is in turn connected to a generally axially outwardly extending arcuate portion 75.

The arcuate portion 75 has an edge surface 76 which is adapted to engage behind the shoulder 61 of the bumps 62. As is shown in Figure 6 the outer margin of the extension portion 75 is turned generally radially outwardly to define side edges or surfaces 77—77 and which are adapted to abut on opposite sides of the bumps 63. These surfaces 77 cooperate with the edge surface 76 to define a pocket in which the bump is engaged when the cover is in assembly with the wheel. When the cover is in assembly the side surfaces 77—77 serve to insure co-rotation of the cover on the wheel.

The cover may be assembled on the wheel by aligning the valve stem 60 with one of the cover openings 70 and upon the application of an axially inward force the extensions 72 goes through stages of tentative engagement with the tire rim 57 and then into full retaining cooperation behind the bumps on the wheel.

When the cover is in assembly upon the wheel it will be noted a pry-off rib 78 is in bottomed engagement against the outer margin of the tire rim.

To remove the cover, a pry-off tool may be inserted underneath the outer margin 65 of the cover 56 with the tip of the tool being progressively wedged and urged underneath the rib until the retaining extensions 72 are disengaged from the wheel.

It will be understood that modifications and variations may be effected without departing from the scope of the novel concepts of the present invention.

I claim as my invention:

1. In a wheel structure including a wheel having circumferentially spaced wheel openings between body and rim parts and having rigid bumps on an axial portion of the wheel, a wheel cover member adapted for overlying disposition upon the wheel having circumferentially spaced openings generally opposite the wheel openings with the cover opening material forming extensions integral at one end with the cover, said extensions being return bent upon itself defining a loop including a resilient axial portion, said axial portion having a pocket including a first edge surface to engage behind the bump and opposed side surfaces to bear against sides of the bumps to insure co-rotation of the cover and wheel, said side surfaces of said resilient axial portion being defined by laterally opposed margins of said extension and being turned generally radially away from said extension to define a relatively deep pocket to envelop said bump.

2. In a wheel structure including a wheel having body and rim parts and having rigid bumps on an axial portion of the wheel, a wheel cover member adapted for overlying disposition upon the wheel having circumferentially spaced openings with the cover opening material forming extensions integral at one end with the cover, said extension being return bent upon itself defining a loop including a resilient axial portion, said axial portion having a pocket including a first edge surface to engage behind the bump and opposed side surfaces to bear against sides of the bumps to insure co-rotation of the cover and wheel, said side surfaces of said resilient axial portion being defined by laterally opposed margins of said extension and being turned generally radially away from said extension to define a relatively deep pocket to envelop said bump.

3. In a wheel structure including a wheel having body and rim parts and having rigid bumps on an axial portion of the wheel positioned radially of an axially outwardly facing rim portion, a wheel cover member adapted for overlying disposition upon the wheel including an outer margin axially spaced from the wheel and with the cover having circumferentially spaced openings with the cover opening material forming extensions integral at one end with the cover, said extension being return bent upon itself defining a loop including a resilient axial portion, said axial portion having a pocket including a first edge surface to engage behind the bump and opposed side surfaces to bear against sides of the bumps to insure co-rotation of the cover and wheel, said resilient axial portion having a curled terminal positioned generally radially outwardly of the pocket facing the axially outwardly facing rim portion and positioned just slightly inwardly from and concealed by the outer margin so that a pry-off tool may be engaged underneath the outer margin behind the curled terminal, said edges about the pocket being turned radially away from said extension to increase the depth of the pocket in which the bump is telescoped and retainingly engaged by the edges.

4. In a wheel structure as defined in claim 3, said curled terminal being in bottomed engagement against said axially outwardly facing rim portion.

References Cited in the file of this patent

UNITED STATES PATENTS

| | | |
|---|---|---|
| 2,160,272 | Kranz | May 30, 1939 |
| 2,368,238 | Lyon | Jan. 30, 1945 |
| 2,624,640 | Lyon | Jan. 30, 1953 |
| 2,669,487 | Horn | Feb. 16, 1954 |